Jan. 2, 1951          M. G. CLAY          2,536,724

UNIFIED EXCAVATOR CONTROL SYSTEM

Filed March 7, 1946          6 Sheets-Sheet 1

INVENTOR.
Murray G. Clay
By Fred Gerlach
Attys.

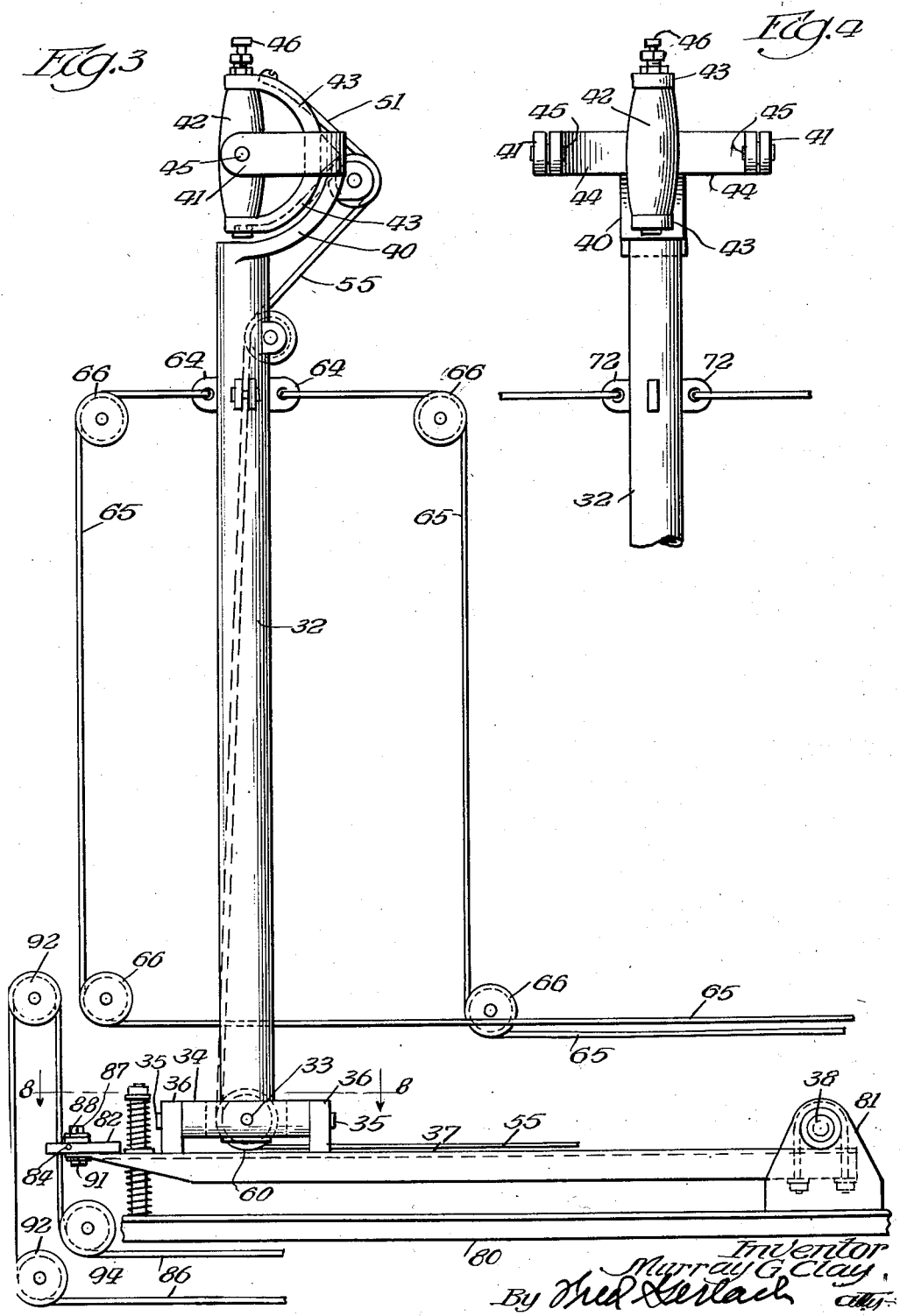

Jan. 2, 1951 M. G. CLAY 2,536,724
UNIFIED EXCAVATOR CONTROL SYSTEM
Filed March 7, 1946 6 Sheets-Sheet 3
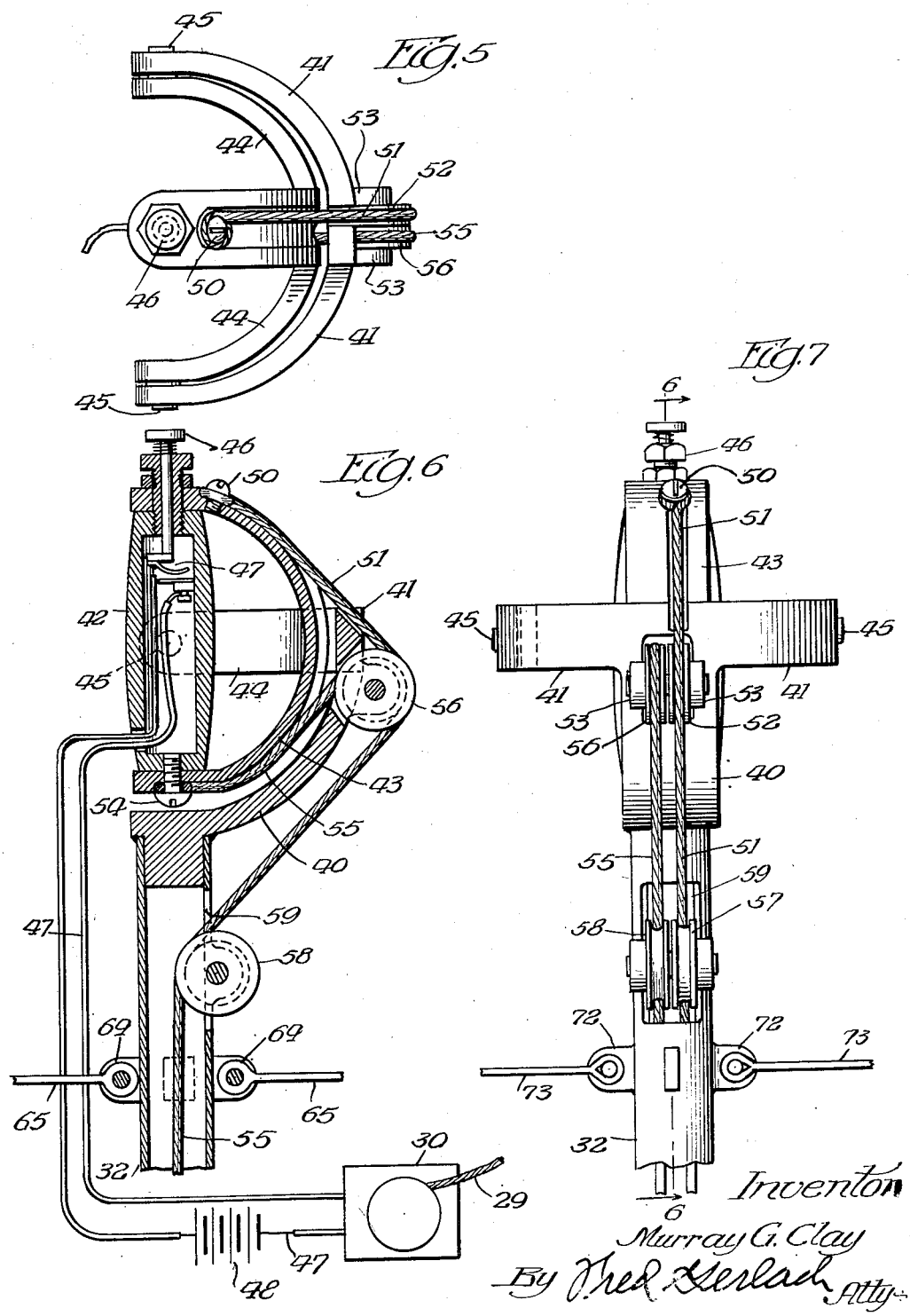
Inventor
Murray G. Clay
By Fred Gerlach, Atty.

Jan. 2, 1951
M. G. CLAY
2,536,724
UNIFIED EXCAVATOR CONTROL SYSTEM
Filed March 7, 1946
6 Sheets-Sheet 4
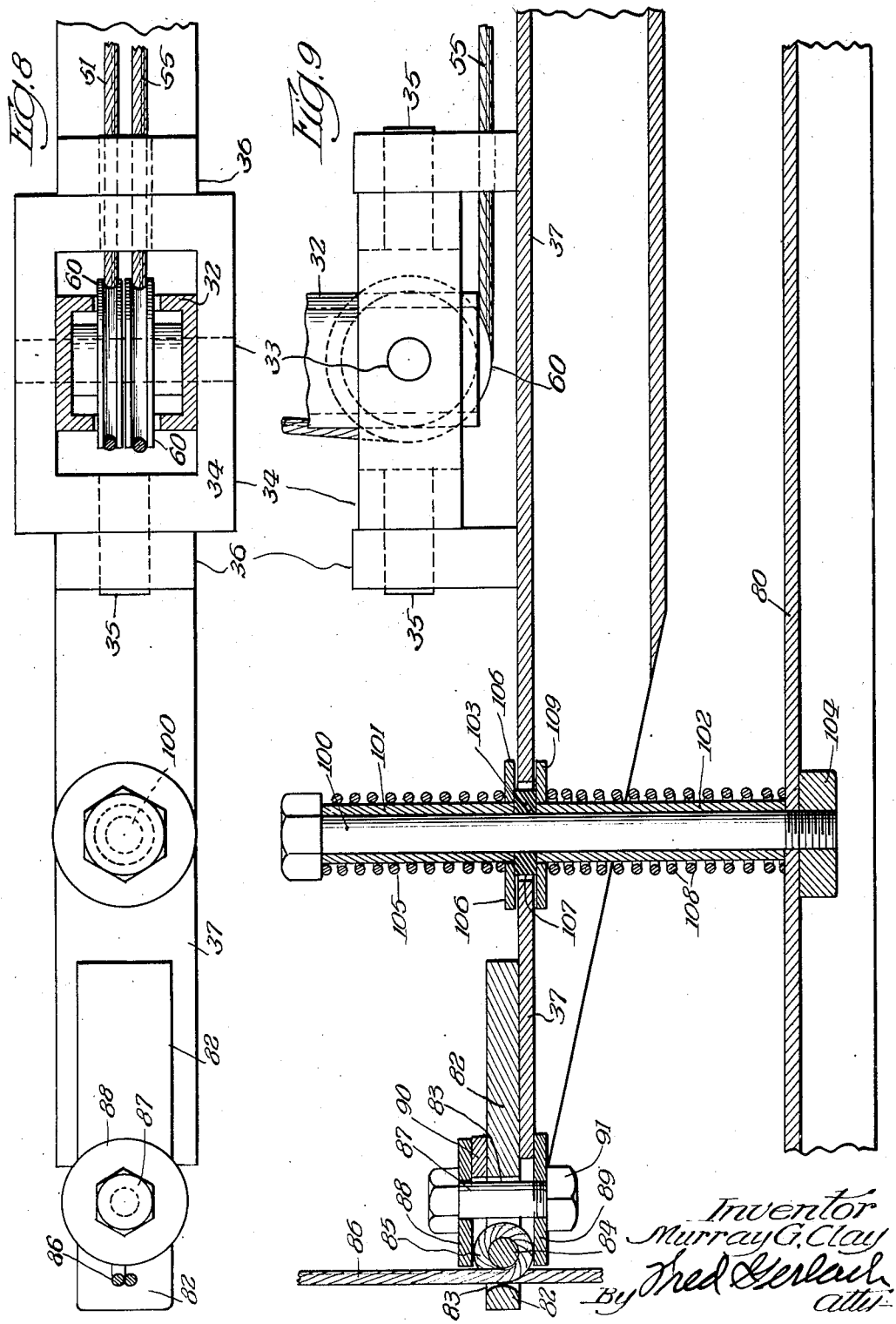
Inventor
Murray G. Clay
By Fred Gerlach
Atty.

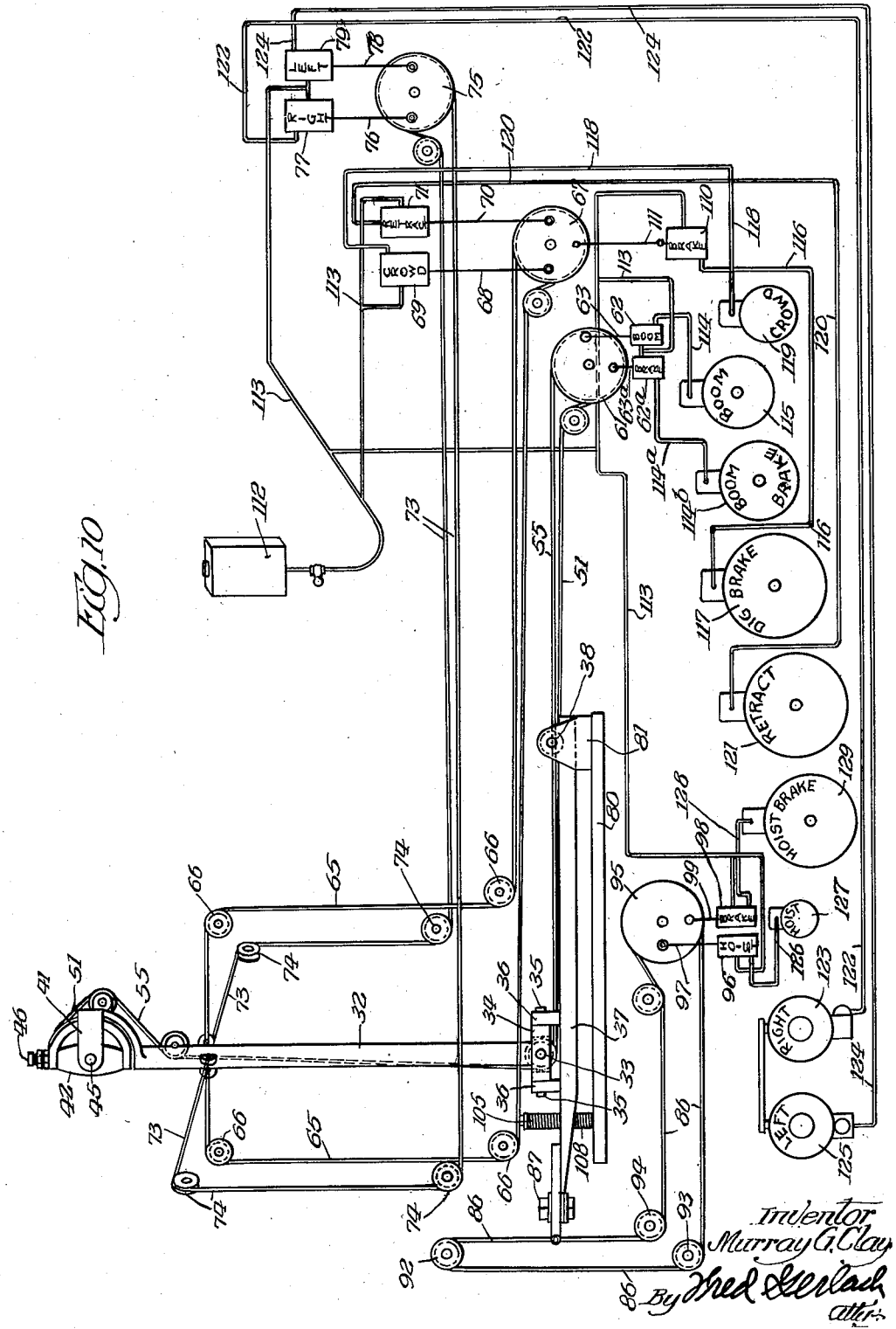

Jan. 2, 1951 M. G. CLAY 2,536,724
UNIFIED EXCAVATOR CONTROL SYSTEM
Filed March 7, 1946 6 Sheets-Sheet 6
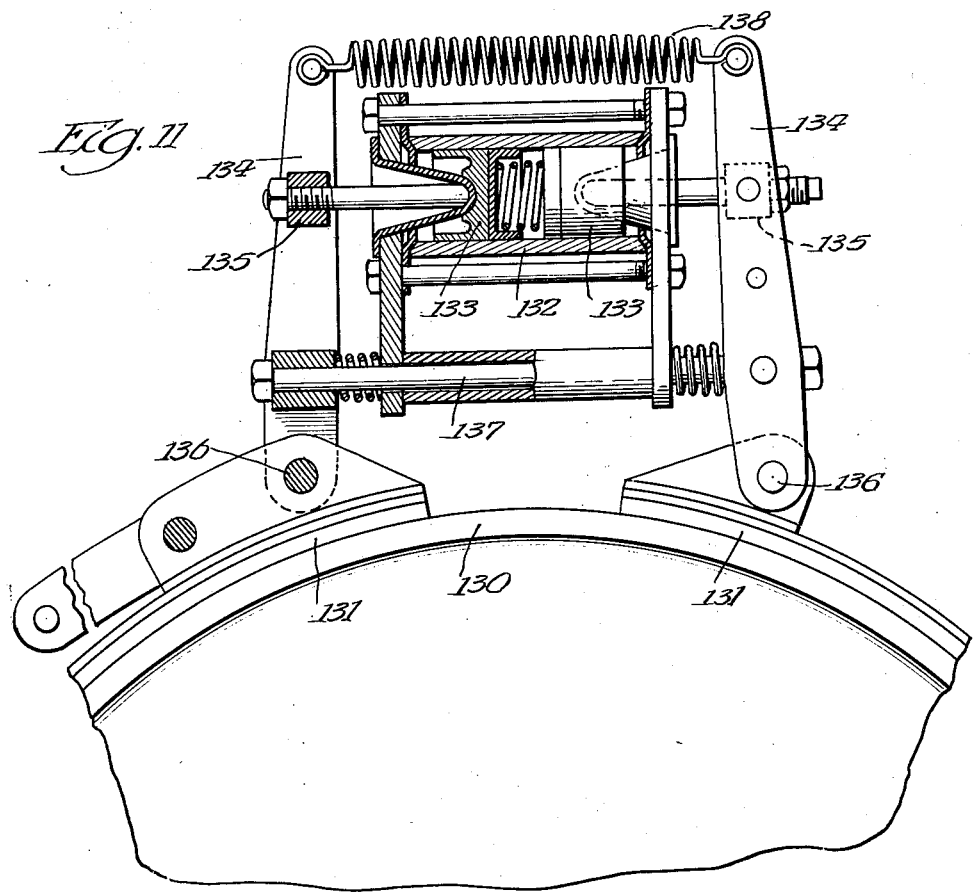
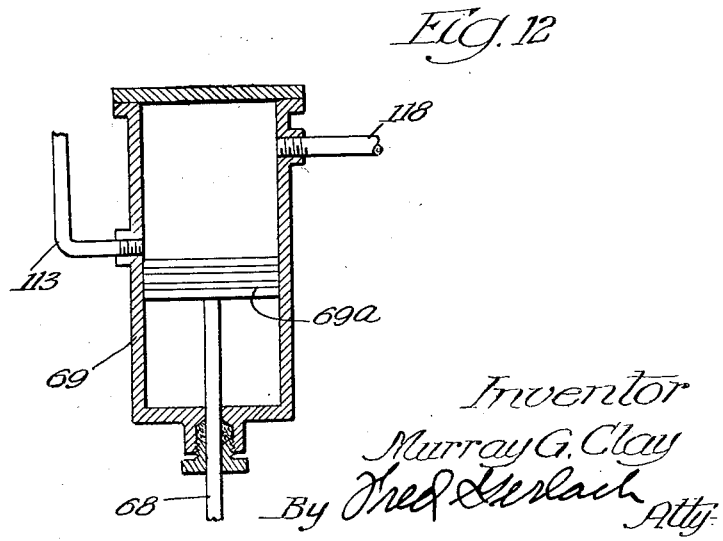
Inventor
Murray G. Clay
By Fred Gerlach Atty.

Patented Jan. 2, 1951

2,536,724

UNITED STATES PATENT OFFICE 2,536,724

UNIFIED EXCAVATOR CONTROL SYSTEM

Murray G. Clay, Chicago, Ill.

Application March 7, 1946, Serial No. 652,660

44 Claims. (Cl. 214—135)

This invention relates in general to a hydraulic control system for excavators and excavating cranes of the friction driven type and including a plurality of controlling means located at a control position for actuation by a single operator, the present invention being more particularly described as a single or unitary control member movable in a plurality of directions for causing the engagement and disengagement of the several parts such as clutches and brakes which cause the excavator to perform its usual movements.

An important object of the invention is to provide a single or unitary operating or control member for effecting the movement of a plurality of hydraulic controlling parts by movements in relatively different directions.

This invention relates in general to an improvement in a friction driven excavator of the type which is shown in United States Patent No. 2,356,517 and comprises a tractor base with a controlling cab mounted thereon for free rotation in both directions. Two principal drums are mounted within this rotary cab, one of the drums being a hoisting drum driven in a forward direction by a friction clutch and having a friction brake for engaging and holding it. The other principal winding drum is for digging, and it is arranged to be driven in a forward direction by one friction clutch and in the opposite direction by another friction clutch. In addition, a friction brake is provided for arresting and holding this drum in place.

An excavator having these parts and embodying a dipper bucket, requires the following controls: right or left swing, forward digging or crowding, rearward moving or retracting, a digging brake, boom hoisting, and a hoist brake.

Heretofore the above controls were accomplished by a number of levers and foot pedals; the right and left swing by a single lever, operated in opposite directions from a central or neutral position, a crowding or retracting movement by another single lever, a hoisting lever, a boom lever, a foot pedal for the hoisting brake and a foot pedal for the digging brake. To these is added an electrically operated trip for the bottom of the bucket.

The present invention has for primary object to combine the operations of all of the above levers and their operating connections in a single lever movable in a plurality of directions. For example, the single lever is movable from side to side to swing the boom either to the right or to the left; it is movable forward and back to crowd and retract the bucket; and it is moved up and down to raise or lower the bucket. The boom is raised or lowered by a separate movement of a portion of the handle of the single lever, the tripping of the bucket being affected through a push button located on the handle.

Thus another object of the invention is to provide a hydraulic control system in which the single control unit is generally of new and improved construction and is characterized by simplicity of design and operation as well as ease and facility of assembly and use.

Other objects of the invention and various advantages and characteristics of the present combined and unitary control system will be apparent from a consideration of the following detailed description.

The invention consists in the unified novel control system and the novel features of construction which are hereinafter described and more particularly defined by the claims at the conclusion hereof.

In the drawings which accompany and form a part of this specification or disclosure and in which like numerals of reference denote corresponding parts throughout the several views:

Figure 3 is a side elevation of the unitary control mechanism forming the subject matter of the present invention;

Figure 4 is a detail elevation of the upper portion of the control member shown in Figure 3;

Figure 5 is a top view of the control member shown in Figure 3;

Figure 6 is a vertical section of the upper end of the control member;

Figure 7 is a rear elevation of the upper end of the control member shown in Figure 6;

Figure 8 is a horizontal section of the mounting for the control member as taken on the line 8—8 of Figure 3;

Figure 9 is a view, partly in side elevation and partly in section, of the mounting mechanism as shown in Figure 8;

Figure 10 is a diagrammatic illustration of the piping and control connections for a single operating unit as applied to an excavator in accordance with this invention;

Figure 11 is a fragmentary view, partly in section, of a fluid actuating brake device as diagrammatically represented in Figure 10; and Figure 12 is a sectional view of a fluid pressure applying device for actuating a friction operating device as shown in Figure 11.

Figure 1:
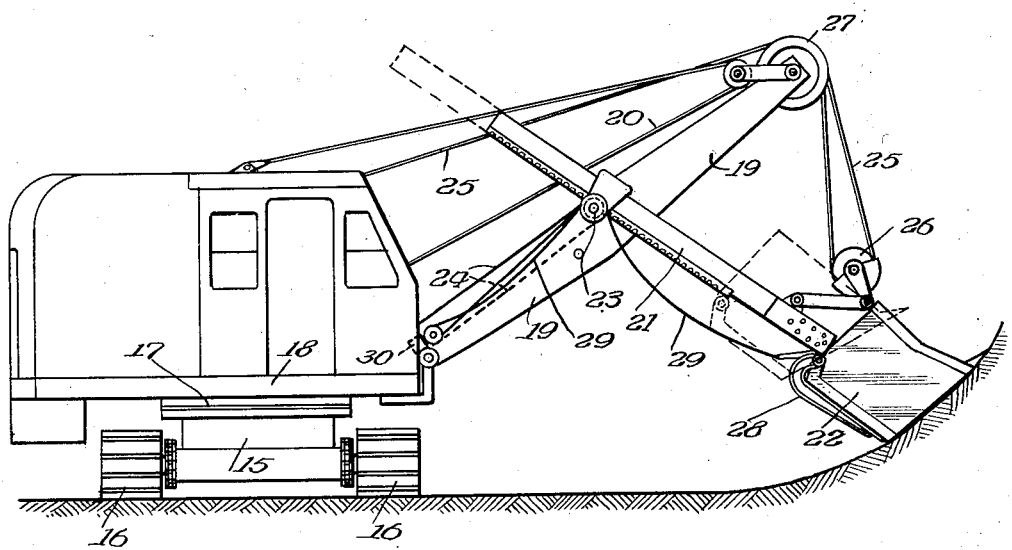
Figure 1 is a side view of an excavator to which the apparatus of this invention is applied, showing several of the movements which are subject to control.
Figure 2:
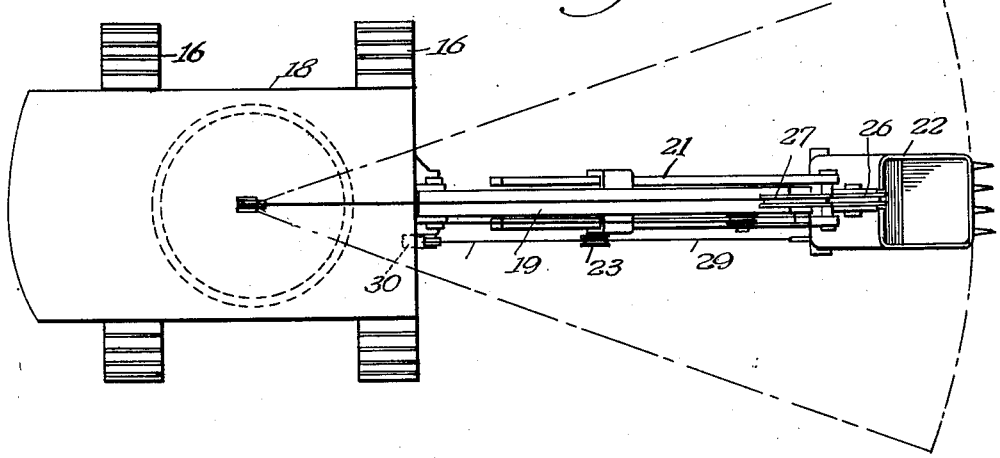
Figure 2 is a plan view of the excavator shown in Figure 1 illustrating the side movement thereof.

This invention is described as it may be applied to a mobile type of excavator as shown more clearly in Figures 1 and 2, by way of illustration and not of specific limitation, as it may have a more general application in a variety of ways.

In the excavator shown in Figures 1 and 2, a supporting base 15 is mounted upon tractor elements 16 for free movement from place to place. Mounted rotatably upon the base by means of a turntable 17 is an excavator cab 18 in which the operating mechanism (not shown) and the control mechanism of this invention are located.

Pivoted on the forward end of the cab is a boom 19 which is raised and lowered by hoisting mechanism within the cab by means of a cable 20. Mounted upon the boom intermediate the ends thereof is a dipper stick 21 which carries a dipper bucket 22 at its lower end and is operated by a shaft 23. The latter when driven in one direction or the other by means of a driving connection 24 from the cab either to crowd or retract the dipper stick and bucket. The bucket is raised and lowered by a hoisting cable 25 which extends around a pulley 26 at the top of the bucket and a pulley 27 at the distal end of the boom and is wound upon a drum (not shown) within the cab. The bucket has a pivoted bottom 28 with a latch which is released by a pull cord 29 extending to the boom and thence to an electrical device 30 within the cab; such device is energized by an electrical circuit which is closed by a push button at the upper end of the operating lever as hereinafter described. All of the foregoing parts are common to this type of excavator and their operation and use is well known in practice, the various operating cables and parts being connected to and operated by suitable driving mechanisms as shown for example, in Figure 5 of aforementioned Patent No. 2,356,517, the present invention being confined to the controlling mechanism for the frictional brakes as represented generally in Figure 10 and comprising particularly the single controlling unit as herein shown and described.

The controlling unit comprises a hollow upright tube 32 which is mounted at its lower end upon a shaft 33. The latter is rotatably carried by a block 34 which is rotatably or pivotally supported by trunnions 35 at right angles to the shaft 33. The trunnions are mounted in bearings 36 which are connected to one end of a supporting latter 37. The lever is mounted at its outer end to swing up and down about a pivot 38 and as a result the tube is mounted to swing in directions at right angles to each other upon the shaft 33 and the trunnions 35 and to be raised and lowered about the pivot 38.

At the top of the hollow tube 32 is an upwardly extensing arcuate arm 40 with lateral extensions 41 for mounting a handle 42 therein. This handle is arranged in a vertical direction as a substantial continuation of the tube 32 by a curved holder 43 which extends to the top and bottom of the handle and has lateral extensions 44 corresponding to the side extensions 41 of the arm 40. The ends of the extensions 44 are rotatable on pivots 45 which are connected to, and extend inwards from, the outer ends of the extensions 41. Thus the handle 42 is a substantial continuation of the tube 32 at the upper end thereof and is rotatable with respect to the arm 40 about the pivots 45 which form a horizontal axis. At the top of the handle is a switch controlling push button 46 for making an electrical connection between conductors 47 which connect a battery 48 to an electrically operated device 30 for operating the pull cord 29 to release the bucket bottom 28 whenever the circuit is closed by the push button.

Connected to the upper portion of the holder 43 by means of a fastening screw 50 is a cable 51 which extends around a pulley 52. The latter is rotatably mounted between ears 53 which are connected to, and extend outwardly from, the upper end of the arm 40. Secured to the lower end of the holder 43 by means of a fastening screw 54 is a cable 55 which extends over a pulley 56. The latter is rotatably mounted between the ears 53 and is in side by side relation with the pulley 52. The cables 51 and 55 pass downwardly over pulleys 57 and 58 respectively. Such pulleys are mounted at the upper end of the tube 32 and guide the cables through an opening 59 into the interior of the tube. At the bottom of the tube are corresponding pulleys 60 around which the cables pass. From the pulleys 60 the cables extend over the lever 37 and then are joined together and extend around a boom operating pulley 61 which is mounted for limited rotation, controls a fluid pressure boom raising device 62 by means of a connection 63 and controls a boom brake operating device 62a by means of a connection 63a.

At the front and rear of the tube 32 are projections 64 for engaging the ends of a cable 65 which extends therefrom around directional pulleys 66 to a crowd and retract pulley 67. The latter pulley has a connection 68 at one side extending to a fluid pressure crowding device 69 and a connection 70 at its other side extending to a fluid pressure retracting device 71. Also operated by the pulley 67 is a fluid pressure brake operating device 110 which has an operating connection 111 extending from the bottom of the pulley.

At the sides of the tube are projections 72 for engaging the extremities of a cable 73 which extends therefrom over directional pulleys 74 and around a right and left pulley 75. This pulley has a connection 76 extending to a right fluid pressure controlling device 77 and another connection 78 extending to a left fluid pressure controlling device 79.

The lever 37 upon which the tube 32 is mounted overlies a fixed supporting base 80 having at one end projections 81 in which the pivot 38 is mounted. At the distal end of the lever 37 is a cable clamp comprising a plate 82 with a slot 83 therein extending beyond the end of the lever 37. A bar 84 extends across the slot and provides means for engaging a loop 85 of a cable 86. To hold the loop in place, a bolt 87 is inserted through the slot 83 as shown in Figure 9. This bolt extends through upper and lower clamping washers 88 and 89 which engage the cable loop 85 above and below the plate 82. The lower washer abuts against the extremity of the lever 37 and the upper washer engages a spacer block 90. The bolt 87 has at its lower end which when tightened results in the plate 82 being tightly held in engagement with the lever and the loop of the cable 85 being tightly clamped by the washers around the cross bar 84. One portion of the cable 86 extends upwardly over a pulley 92 and thence downwardly around a directional pulley 93. Another portion of the cable extends downwardly from the lever 37 and then around a directional pulley 94, and the intermediate portion of the cable 86 extends around a hoist and brake operating pulley 95. A fluid pressure hoist operating device 96 is operated by means of a connection 97 extending from one side of the pulley, and a fluid pressure hoist brake operating device 98 is operated by a connection 99 extending from the lower side of the pulley 95.

For the purpose of maintaining the lever 37, the cable 86 and the pulley 95 in normally centered or intermediate position, a resilient centering device is provided. This device is mounted upon the supporting base 80 and extends through the lever 37 at a point between the distal extremity thereof and the adjacent mounting for the lower end of the tube 32. As shown more clearly in Figure 9, the resilient centering device comprises a bolt 100 having mounted thereon a pair of sleeves 101 and 102 and a collar 103 between the sleeves. The length of the bolt 100 is such that the bolt extends from the base 80 upwardly through and above the lever 37. The collar 103 is located at the normal level of the lever 37.

A nut 104 is mounted on the lower end of the bolt below the base 80 and serves firmly to maintain the bolt, sleeves and collar in position. Surrounding the upper sleeve 101 is an extended coil spring 105, the upper end of which engages the head of the bolt 100 and the lower end of which engages a washer 106. The inner margins of the washer engages the collar 103 and the outer margin overlaps a perforation 107 in the lever 37. A partially expanded coil spring 108 surrounds the sleeve 102 and its lower end in abutment with the upper face of the base 80. The upper end of the spring 108 abuts against a washer 109 which contacts the collar 103. The outer margin of the washer 109 overlaps the perforation 107 in the lever 37.

With this construction, downward pressure or movement of the tube 32 will compress the lower spring 108 and move the cable 86 in such manner as to rotate the fluid pressure operating pulley 95 in one direction. When the tube 32 is raised, the upper spring 105 is compressed by the lever 37 through the medium of the washer 106 and the cable 86 and its connected parts are moved in a reverse direction. When upward or downward pressure of the tube is released, the spring which has been compressed will operate to return the tube 32 and its mounting lever 37 to a centralized position.

As illustrated in Figure 10, all of the fluid pressure operating devices 62, 62a, 69, 71, 77, 79, 96, 98 and 110 receive by gravity a supply of fluid from a tank or reservoir 112. The latter is located at an elevation above the highest fluid pressure device and is connected thereto by a manifold supply pipe 113. Each fluid pressure device when actuated by its operating connection is effective to apply fluid under pressure to a fluid pressure device which the operating device controls. Each operating device may therefore be regarded as a pump actuated by its operating connection to force fluid under pressure therefrom.

An example of a fluid pressure operating device may be utilized for this purpose as shown in Figure 12. Such device is the fluid pressure crowding device 69 and comprises a cylinder which receives fluid from the reservoir 112 by way of the manifold supply pipe 113. The latter is connected to the cylinder at a point intermediate the ends thereof. A pipe 118 for conveying fluid under pressure from the crowding device 69 to a frictional crowding device 119 is connected to the upper end of the cylinder. A piston 69a is movable in the cylinder by means of the connection 68 which may be considered as a piston rod passing through a suitable packing or stuffing box at the lower end of the cylinder. With this construction, the piston itself has a normal open position just below the cylinder opening to which the discharge end of the pipe 113 leads. The first part of upward movement of the piston serves to close the cylinder opening and continued upward movement of the piston forces fluid under pressure from the cylinder into the pipe 118. The return movement of the piston relieves the pressure on the device which the device 69 operates, and if there is any loss of fluid after the piston returns to its normal rest position, this loss is replenished by the pipe 113. Upward movement of the piston is always quickly effective to apply the necessary pressure to the device 119.

Since the fluid pressure devices of the present invention are represented as applied to a friction driven excavator comprising cable winding and brake drums operated by a suitable source of power and controlled by fluid actuated brakes, the controlled fluid pressure devices, as diagrammatically represented in Figure 10, may be considered as brake mechanisms which are applied and released by fluid pressure devices.

A suitable type of brake device is illustrated in Figure 11. Such device operates to control a drum 130 by contraction of a brake band 131 therearound and comprises a cylinder 132. Fluid under pressure is introduced into the center of the cylinder 132 from one of the aforementioned fluid pressure operating devices. Two opposed outwardly acting pistons 133 are slidably mounted in the ends of the cylinder 132 and are operatively connected to the upper ends of rocker arms 134 by cross pieces 135. The lower ends of the arms are connected by pivots 136 to the extremities of the brake band 131. Between the pistons and the connected lower ends of the arms is a fulcrum bolt 137 and as a result outward movement of the pistons in response to the introduction of fluid under pressure into the cylinder 132 causes the brake band to be tightened about the brake drum 130. Connecting the upper ends of the arms 134 is a tension spring 138 which tends to draw the opposed pistons together when the supply of fluid under pressure to the cylinders is released. Inward sliding movement of the pistons in response to the action of the spring 138 results in release of the brake band 131 from its engagement with the brake drum.

Extending from the fluid pressure device 62 is a pipe 114 which leads and is connected to the boom raising device 115; extending from the device 62a is a pipe 114a which is connected to the boom brake operating device 114b; extending from the operating device 110 is a pipe 116 which is connected to a digging brake device 117; extending from the operating device 69 is a pipe 118 which leads to a frictional crowding device 119; extending from the operating device 71 is a pipe 120 which leads to a frictional retracting device 121; extending from the device 77 is a pipe 122 which leads to a right frictional driving device 123; extending from the operating or controlling device 79 is a pipe 124 which leads to a left frictional driving device 125; leading from the device 96 is a pipe 126 which is connected to a frictional hoisting device 127; and leading from the device 98 is a pipe 128 which is connected to a frictional hoist brake 129.

With the apparatus for operating an excavator as diagrammatically illustrated, only a single controlling unit as herein shown and described is required. By the connections as previously described, it is possible to control and operate a dipper bucket type of excavator with this single operating unit in place of a plurality of separate levers and foot brakes for accomplishing the same result. If operating fluid pressure is not sufficient, any suitable pressure booster may be added to exert more force than by hand actuation.

To swing the boom 19 from side to side as illustrated in Figure 2, the tube 32 is swung to one side or the other. This actuates the right or left clutch type frictional driving devices 123 or 125 since the ends of the cable 73 are connected to the sides of the control unit. To raise or lower the bucket 22 by means of its cable 25, the tube is moved up or down on its supporting lever 37. As indicated in Figure 10, the hoist brake controlling device 98 is so arranged that the brake is set when the tube is in its neutral position vertically, thus causing the bucket to be raised under power, held in place, or allowed to move down under gravity when the control handle is respectively raised, set at neutral, or depressed. To crowd the bucket into a bank or to retract it by actuating dipper stick 21, the tube 32 is swung forwardly or rearwardly upon its pivotal mounting which will actuate either the frictional crowding device 119, the frictional retracting device 121 or set dig brake 117 if the control is neutralized in this direction. To raise the boom 19, hold it in a fixed position vertically, or allow it to descend under gravity the handle 42 is respectively rocked on pivot 45 rearwardly to actuate boom raising device 115, centered in line with tube 32 to set boom brake 114b, or rocked forwardly to release both the boom brake and the boom raising device.

All of the above movements are in the natural directions of the parts themselves either forward and back, laterally, up and down, or simply oscillating the handle and each movement of the controlling unit can be made in combination or separately with the unit in any position so that the controlling unit has a universal movement in the three space dimensions and the handle may be independently rotated upon its axis which is parallel to that of the axis of movement of the tube in the crowding and retracting direction.

In addition to the above movements, the pivoted bottom 23 of the bucket may be tripped at any time without removing the hand from the handle 42 by simply pressing the push button 43 at the upper end of the handle. This will cause the operation of the electrical device 30 which will operate the pull cord 29 to trip the pivoted bottom.

As thus described, the movement of the bucket corresponds to the movement of the controlling unit with the addition that the independent movement of the handle causes the raising and lowering movement of the boom. In this respect, the movement of the bucket, separate from the movement of the boom, corresponds directly with the universal movement of the controlling unit so that the controlling unit is simply moved in the direction in which it is desired that the bucket shall move and the operating mechanism will effect that movement. Since the boom and the bucket will fall or move downwardly by their own weight, it is necessary to have a brake in connection with each one for holding it in any desired position. In other excavators, a separate foot operating brake is provided for each of these operations which is controlled in the present invention by the fluid pressure devices as herein set forth.

While a preferred embodiment of this invention has been described in detail, it should be regarded as an example and not a limitation of the invention as various changes in the construction, combination and arrangement of the parts adapting this mechanism to other uses may be made without departing from the spirit and scope of the invention.

Having thus described the invention, what I claim as new and desire to secure by Letters Patent is:

1. A control system comprising an upright tube, means at the bottom of the tube mounting it for up and down, forward and back, and internal movement in either direction from a central position, a handle at the upper end of the tube, control means connected to the handle and extending through the tube, and means independent of the mounting means and operative to pivot the handle for movement in either direction from a central position.

2. A control system comprising an upstanding control member, means at the lower end of the member for mounting said member to swing laterally in two different directions and to move up and down, a handle at the upper end of the member, control means connected to the handle and extending down the member around one axis about which said member swings, and means for mounting the handle to swing about a horizontal axis, extending transversely of the member.

3. In a controlling system of the class described, an upstanding control member; means at one end of the member for mounting said member to swing forward and back, up and down, and laterally in order to provide three controls; a handle at the other end of the member for bodily moving said member in such directions; means for mounting the handle to swing about a horizontal axis parallel to one of the swinging axes of the member but with a different arc of movement constituting a fourth control; and a push button on the handle for an electrical control system, constituting a fifth control.

4. An excavator comprising a portable base mounted to swing about a vertical axis, a boom connecting to and projecting from the base and provided at the outer end with hoisting mechanism, a dipper stick carried by the boom to move forwards and rearwards and provided at one end thereof with a bucket connected to the hoisting mechanism, frictional power driven means for rotating the base, and for actuating the hoisting member to raise and lower the bucket, fluid pressure controlling means for the said frictional power driven means comprising fluid pressure actuating devices, and a single control unit movable back and forth from a neutral position in the three directions at right angles to each other and so operatively connected to said device that when it is moved back and forth in one direction it results in back and forth swinging of the base, when it is moved back and forth in another direction it results in forward and rearward movement of the dipper stick, and when it is moved back and forth in the third direction it results in raising and lowering of the bucket.

5. An excavator comprising a portable base mounted to swing about a vertical axis, a boom connected to and projecting from the base and provided at its outer end with hoisting mechanism, a dipper stick mounted on the boom to move forwards and rearwards and provided at one end with a bucket connected to the hoisting mechanism, friction type driving means for rotating the base, for moving the dipper stick forwards and rearwards to effect crowding and retraction of the bucket and for actuating the hoisting mechanism to raise and lower the bucket, fluid pressure means for controlling said driving means, and a unitary control unit movable from a neutral position in three directions at angles to each other and so operatively connected to said fluid pressure means that when it is moved back and forth in one direction it results in back and forth swinging of the base, when it is moved back and forth in another direction it results in forward and rearward movement of the dipper stick, and when it is moved back and forth in the third direction it results in raising and lowering of the bucket, said control unit and fluid pressure means being so arranged and designed that movement of the bucket corresponds substantially to the control movements of the units.

6. An excavator comprising a supporting base rotatable in either direction about a vertical axis, a boom pivoted at one end upon the base so that it is capable of being raised and lowered, a dipper stick mounted on the boom to move forwards and rearwards and provided at its outer end with a bucket operatively connected to the boom for raising and lowering purposes, frictional type power means to move the dipper stick forwards and rearwards in order to effect crowding and retracting of the bucket to rotate the base in either direction in order to swing the bucket laterally, and to effect raising and lowering of the bucket, fluid pressure means for actuating said frictional type power means, and a single controlling unit mounted for movement in three different angularly related directions corresponding to the movements of the bucket and so operatively connected to the actuating member that its movement in any direction or combination of directions produces a corresponding movement of the bucket.

7. An excavator comprising a portable base rotatable in either direction about a vertical axis, a boom pivoted at one end to the base so that its other end is capable of being raised and lowered, a bucket at one end of a dipper stick movably mounted upon the boom, power means to raise and lower the bucket end of the dipper stick, power means to crowd and retract the dipper stick, power means for effecting said movements, a plurality of fluid pressure controlling means for the power driving means, and a single controlling unit mounted for universal movement in three directions from relatively neutral positions, namely, up and down, forward and back, and from side to side, and so operatively connected to the fluid pressure controlling means that when it is moved up and down it effects actuation of the first mentioned power means, when it is moved forward and back it effects actuation of the second mentioned power means, and when it is moved from side to side it effects actuation of the third mentioned power means.

8. An excavator having a supporting base rotatable in either direction about a vertical axis, a boom having one end thereof pivoted on the base, power means for raising and lowering the other end of the boom, a bucket at one end of a dipper stick movably mounted upon the boom, power means to raise and lower the bucket end of the dipper stick, power means to move the dipper stick to crowd and retract the bucket, power means for rotating the base, fluid pressure controlling means for the first mentioned power means, fluid pressure controlling means for the second, third and fourth mentioned power means, a single controlling unit mounted for movement up and down, forward and back and from side to side and so operatively connected to the second mentioned controlling means that when it is moved up and down it effects actuation of the second mentioned power means, when it is moved forward and back it effects actuation of the third mentioned power means and when it is moved from side to side it effects actuation of the fourth mentioned power means, and a handle pivotally mounted on the unit and so operatively connected to the first mentioned controlling means that when it is rocked it effects actuation of the first mentioned power means.

9. A friction type excavator comprising a supporting base rotatable in either direction about a vertical axis, a boom pivoted at one end upon the base so that the other end is capable of being raised and lowered, a bucket at one end of a dipper stick that is movably mounted upon the boom to effect crowding and retracting of the bucket, means to raise and lower the bucket end of the dipper stick, the movement of the dipper stick and the raising and lowering movement of the boom being in the same plane, frictional power means for effecting the four operative movements and including eight frictional operating devices, a fluid pressure controlling device for each frictional operating device, and a single controlling unit having operating connections to each of the fluid pressure controlling devices for actuating them, said unit being mounted at one end to swing in three angularly related space dimensions and having a handle at its other end pivoted to swing parallel to one of the axes of movement, the unit being movable independently in any dimension and in any combination of its directions of movements to effect corresponding actuation of certain of the fluid pressure units and corresponding operation of the frictional operating devices, and the handle being rotatable in any position of the unit to effect one of said two movements in the same plane.

10. A friction type excavator comprising a supporting base rotatably mounted to swing in either direction about a vertical axis, a boom pivoted at one end upon the base so that its other end is capable of being raised and lowered, a bucket at one end of a dipper stick that is movably mounted upon the boom, means to raise and lower the bucket end of the dipper stick parallel to the raising and lowering movement of the boom, means to crowd and retract the dipper stick, a pivoted bottom for the bucket and means including a latch for the bottom and an electrical means for releasing the latch, frictional power driving means for effecting the operative movement of the base, the boom and the dipper stick, fluid pressure means for actuating the frictional power driving means, a single operating unit mounted at one end for universal movement about three different axes corresponding to the movement of the dipper stick on the boom for raising and lowering, for crowding and retracting, and for swinging the base about a vertical axis, a handle pivoted upon the driving unit and movable therewith and independently thereon to control the up and down movement of the boom, a push button on the handle for engagement by the thumb of an operator without removing his hand from the handle, and an electric circuit which is closed by the button and includes said electrical means for the latch.

11. A friction type excavator having a supporting base rotatable in either direction about a vertical axis, a boom pivoted at one end about the base so as to permit of raising and lowering the other end thereof, a bucket at one end of a dipper stick that is movably mounted upon the boom, frictional power means for moving the base to swing the bucket laterally in either direction for crowding and retracting the bucket by movement of the dipper stick upon the boom for raising the boom and for braking or holding the boom in any fixed position, and for raising the bucket end of the dipper stick and braking or holding it in any raised position, fluid pressure controlling means for each of said frictional power means, a single controlling unit mounted for universal movement about three different axes and having a handle thereon mounted for joint and separate movement upon its own axis for a fourth bucket movement, the movement of the unit or the handle in either direction from a central or neutral position effecting a movement of a corresponding fluid pressure controlling means which in turn causes operation of a frictional power means and a resultant movement of the bucket.

12. In a controlling system of the class described, a single control member, means at one end of the member for mounting said member to swing forward and back and laterally in either direction from a central position and also to move up and down, a handle pivoted at the other end of the member and movable separately of or in conjunction with said member, a fluid pressure controlling device for each direction of movement of the member and a fluid pressure controlling device for each direction of movement of the handle and connections between the member and its devices and between the handle and its devices for operating said devices in accordance with the direction of movement of said member and handle, different fluid pressure controlling devices being operated when the handle or the member is moved in opposite directions from its central position.

13. In a controlling system of the class described, a single control member, means for mounting the member so that it is capable of moving back and forth in three angularly related space dimensions from a central position, a fluid pressure controlling device for each direction of movement of the member, and connecting cable extending between each of the controlling devices and the member for actuating the said controlling means in pairs depending upon the space direction in which the member is moved, one controlling device of each pair being actuated by the member when it is moved from its central position in a particular space direction.

14. In a controlling system of the class described, a single control member, means at one end of the member for mounting said member to swing in three different space directions from a central position, a handle pivotally mounted at the other end of the member to swing back and forth from a central position, a pressure controlling device for each direction of movement of the member and a pressure controlling device for each direction of movement of the handle, cable means between the member and its controlling devices and the handle and its devices for operating the controlling devices in pairs, the member and the handle being jointly and severally movable in either direction or directions from their central positions to actuate any controlling devices separately and in combination with other controlling devices of each of the other three pairs depending upon the direction or directions of movement of the handle and member.

15. In a controlling system of the class described, a plurality of fluid pressure controlling devices arranged in pairs, a rotatable pulley for actuating each pair of devices, cables extending from opposite sides of the pulleys, a single operating member having means whereby it is mounted for movement about three separate axes and connected to certain of the cables to actuate certain pairs of controlling devices by opposite movements from a central position in three directions, a handle pivoted on the member, movable about its axis in opposite directions from a central position, and connected by other cables to operate another pair of said controlling devices, the member and the handle being together movable as one unit and the handle being separately movable thereon at any time with one hand of an operator and serving to effect the joint and several movements of one or more fluid pressure controlling devices.

16. In a controlling system of the class described, a unitary control member having means whereby it is mounted for movement from a common central position oppositely therefrom in three space dimensions, a handle separately pivoted upon the member to swing back and forth from a central position, a plurality of fluid pressure controlling devices, a plurality of cables extending between the member and certain of the devices and between the handle and other devices for actuating a particular controlling device when the member or handle is moved in either direction from its central position, a plurality of fluid pressure power operated units corresponding in number to, and associated respectively with, said controlling devices, each of said controlling devices comprising a fluid pressure piston operating in a cylinder to apply operating pressure to its associated fluid pressure power unit depending upon the direction or directions of movement of the unitary control member and its handle.

17. In a controlling system of the class described, a plurality of fluid pressure power operated units and a plurality of fluid pressure controlling devices for said units respectively, each of the devices having a fluid pressure connection from it to the unit associated therewith and comprising a piston and cylinder for applying pressure therefrom to the associated unit, means for supplying pressure fluid to all of said piston and cylinder controlling devices, said devices having pulleys for operating them in pairs, control cables extending in opposite directions from the pulleys, and a single unitary control for all of said controlling devices comprising a control member mounted for back and forth movement from a central position in a plurality of different directions and operatively connected to certain of the devices and a handle pivoted on the member for movement independently thereof and operatively connected to other cables.

18. In a controlling system of the class described, an elongated upstanding hollow control member, a mounting at one end of the member for supporting said member to swing laterally back and forth in two different directions and also to swing up and down, a handle mounted pivotally on the other end of the member to swing back and forth from a central position wherein it is substantially a continuation of the member, a cable having its ends connected to opposite sides of the handle and extending around pulleys and through the member and then around one of the lateral pivot axes at said one end of the member and outwardly therefrom, the up and down pivot axis of the member being at a distance from the lateral pivot axes, and controlling means connected to said cable and other controlling means connected by cables to the control member, the cable and pivot arrangement being such that the member may be moved about its axes in conjunction with or separately from the operation of the handle without either one affecting the other.

19. In a controlling system of the class described, an elongated control member, means at one end of the member for mounting said member so that it is capable of moving bodily back and forth from a central position in any one of three different directions, an arm at the other end of the member, a handle pivoted on the arm to swing back and forth from a central position wherein it extends substantially as a continuation of the member, means connected to the member and to the handle through the member for actuating any one of a plurality of devices in four different pairs of directions, an electric push button on the handle engageable by the thumb of a hand of an operator grasping the handle, and a circuit adapted to be closed by the push button device.

20. In a fluid pressure system for operating an excavator, a plurality of fluid pressure power operated units and a fluid pressure applying device connected to each unit, the devices being arranged in pairs, a rotatable controlling member for each pair of devices movable in opposite directions from a normal position, the devices of each pair being connected to their rotatable controlling member in such manner that when the member is rotated in one direction one of the devices is applied and the other is released and when the member is rotated reversely the one device is released and the other is applied, and a single control member mounted to move in three space dimensions and operatively connected to one of said rotatable controlling members for each of the three dimensions.

21. In a fluid pressure system for operating an excavator, three fluid pressure power operated units and a fluid pressure applying device connected to each unit, a rotatable controlling member for the devices movable in opposite directions from a central position, one of said devices being connected to the controlling member for power actuation when it is in its central position, and other devices being connected to the rotatable controlling member for power actuation when said member is rotated in either direction from its central position, and a single control member mounted for back and forth movement and operatively connected to the member so as to rotate the latter in response to movement thereof.

22. In combination with an excavator having a bucket mounted for movement laterally in opposite directions, up and down, and into and out of a forward and back digging position, of reversible power means for the lateral, up and down, and forward and back movements of the bucket, a controlling system comprising a single control unit mounted so that it is movable in three space dimensions from a neutral position corresponding to the movements of the bucket in the same dimensions, and control connections between the single control member and the power means whereby the latter are so controlled in response to the movement of the control unit from its neutral position that they cause the bucket to move in the same direction and combinations of directions as said control unit.

23. In combination with an excavator having a bucket mounted for swinging movement in opposite directions for up and down movement, and forward and back, to and from a digging position; of reversible power means for lateral swinging up and down and forward and back movements of the bucket, a controlling system comprising a single control unit mounted so that it is movable in three space directions from a neutral position corresponding to the movements of the bucket in the same three dimensions, a separate means for additionally raising and lowering the bucket in the same plane as its up and down swinging movement independent of the position or movement of the controlling unit, a control member for said separate means mounted for independent movement on said single control unit and movable in either direction from a neutral position thereon, reversible power means for said separate bucket raising and lowering means, and control connections between the single control member and each of the said power means whereby the latter are so controlled in response to the movements of the control unit from its neutral position and from the movement of the separate control means from its neutral position that they cause the bucket to move in the same direction as said control unit and additionally in an up and down direction in accordance with said separate control member independently of the movement of the said control unit and also in conjunction therewith when the control unit is operatively moved.

24. In combination with an excavator embodying a supporting base rotatable in either direction about a vertical axis, a boom pivoted at one end on the base for raising and lowering the other end, a hinged bucket at one end of a dipper stick movably mounted upon the boom; power means to crowd and retract the bucket by a reversing movement of the dipper stick, to raise and control the lowering of the bucket by means of the dipper stick, and to swing the base in either direction about the vertical axis; an excavator controlling system comprising a single control unit member mounted so that it is movable in a single direction or any combination of the three space directions from a neutral position; and control connections between the unit member and the said power means whereby the latter are so controlled in response to movement of the unit member from its neutral position that they cause the excavating bucket to move in the same direction or combination of directions as said control unit member.

25. In combination with an excavator embodying a supporting base rotatable in either direction about a vertical axis, a boom pivoted at one end on the base for raising and lowering the other end, a hinged bucket at one end of a dipper stick movably mounted upon the boom; power means to crowd and retract the bucket by a reversing movement of the dipper stick, to raise and control the lowering of the boom, to raise and control the lowering of the bucket by means of the dipper stick, and to swing the base in either direction about the vertical axis; an excavator controlling system comprising a single control unit member mounted so that it is movable in any direction or any combination of the three space directions from a neutral position and has a separate control member thereon movable in either direction from a neutral position to raise, stop, and control the lowering of the boom in the plane of the crowd and retract movements; and control connections between the unit member and the said power means whereby the latter are so controlled in response to movement of the unit member from its neutral position that they cause the excavating bucket to move in the same direction as said control unit member, and the boom being operated by the said separate control member independent of the other directional operations of the bucket and also in conjunction with the other directional movements of the bucket.

26. In combination with an excavator having a boom and a bucket mounted thereon for up and down movements, for forward and back movements of the bucket to and from digging positions, and for an up and down movement of the boom carrying the bucket therewith; of reversible power means for moving the bucket in its up and down movement, reversible power means for forward and back movements of the bucket, and reversible power means for the up and down movement of the boom; a controlling system comprising a single control unit mounted so that it is movable in different space dimensions from a neutral position; a separate controlling member mounted on and movable with the control unit for the up and down movement of the boom movable in opposite directions from a neutral position; control connections between the control unit and each of said power means for moving the bucket in its up and down movements and forward to and back from its digging movements in response to the movements of the control unit in different dimensions from its neutral position; and control connections between the separate controlling member and the power means for the up and down movements of the boom in response to the movements of the separate controlling member from its neutral position independent of the movement of the bucket in response to the operation of said unit and also in conjunction therewith.

27. The combination with an excavator having a bucket mounted for up and down movements and for forward and back movements in the same relative plane, of reversible power means for the up and down movements, reversible power means for the forward and back movements, a controlling system comprising a single control unit mounted so that it is movable in different space dimensions from a neutral position, a control member mounted for independent rotation on said unit, and control connections between the control unit and the power means and between the control member and the power means whereby the latter are so controlled in response to the movements of the control unit or the control member from its neutral position that they cause the bucket to move accordingly in one or both space dimensions.

28. The combination with an excavator having a bucket mounted upon a boom pivoted at one end and to swing laterally, of reversible power means for laterally swinging the boom in opposite directions and reversible power means for controlling the up and down movements of the free end of the boom in the same relative plane, a controlling system having a control unit movable in opposite directions from a neutral position, control connections between said unit and each of said power means for laterally swinging the boom in response to the movements of the control unit from its neutral position, a separate control member mounted upon and movable with said control unit in opposite directions from its neutral position, and control connections between the separate control member and the up and down reversible power means for raising and lowering the free end of the boom in accordance with the movement of the separate control member.

29. The combination with an excavator having a boom pivoted at one end and raised and lowered at the other and an excavator bucket mounted for forward and backward digging movement relative to the boom and in the same relative plane, of reversible power means for controlling the raising and lowering movement of the boom and reversible power means for the said forward and backward movement, a controlling system having a control unit mounted for opposite movement from a neutral position, control connections between said unit and the power means for the forward and backward movements of the bucket due to the movement of the control unit from its neutral position, a separate control member mounted upon the control unit to move bodily therewith and pivoted for opposite movement from a neutral position, and control connections between said control member and the power means for raising and lowering movement of the boom due to the movement of the separate control member from its neutral position independently of and jointly with the forward and backward digging movement.

30. The combination with an excavator having a bucket mounted for lateral swinging movements and a raising and lowering movement, of reversible power means for effecting the lateral movements and reversible power means for effecting the raising and lowering movements of the bucket, a controlling system having a control unit mounted for opposite movements from a neutral position, a separate control member also mounted upon the control unit and pivoted for opposite movements from a neutral position, control connections between said control unit and the power means for effecting the lateral movements of the bucket due to the movements of the control unit from its neutral position, and control connections between the separate control member and the power means for effecting the raising and lowering of the bucket due to the movements of the control member from its neutral position independently of and jointly with the opposite movements effected by operation of the control unit.

31. The combination with an excavator having a boom pivoted at one end to raise and lower at the other and having a bucket raised and lowered relative to the boom, of reversible power means for effecting the raising and lowering of the boom and reversible power means raising and lowering the bucket, a controlling system comprising a control unit mounted to move oppositely from a neutral position and a separate control member mounted to move oppositely from a neutral position, control connections between the control unit and the power means for raising and lowering the bucket in response to the movements of the control unit in either direction from its neutral position, and control connections between the separate control member and the power means for raising and lowering the free end of the boom in response to the movements of the separate control member in either direction from its neutral position.

32. The combination with an excavator having a bucket and means mounting it to move laterally in either direction and means mounting it to crowd and retract by its forward and rearward movements, of reversible power means for moving the bucket laterally and reversible power means to crowd and retract the bucket by moving it forwardly and rearwardly, a controlling system comprising a control unit mounted to move oppositely from a neutral position, a separate control member mounted to move oppositely from a neutral position, control connections between the control unit and the power means for moving the bucket laterally in response to the movements of the control unit from its neutral position, and control connections between the separate control member and the crowd and retract power means for moving the bucket in response to the movements of the separate control member from its neutral position 33. The combination with an excavator having a boom pivoted at one end and power means for raising, braking and controlling the lowering of the other end, of a bucket mounted upon the boom and power means for raising and lowering the bucket relative to the boom, means mounting the bucket for forward and rearward movement relative to the boom and power means for effecting these movements, means mounting the boom and bucket for lateral movement in either direction and power means for effecting the lateral movements thereof, a controlling system for operating the power means comprising a single control unit movable in different directions from a neutral position, control connections between the said unit and a plurality of the power means whereby the latter are so controlled in response to the movement of the control unit from its neutral position as to cause the movement of the bucket in one or more of the above dimensions, and a separate control member movable in opposite directions from a neutral position and having control connections between the members and at least one set of power means for moving the bucket in opposite directions as the control member is moved from its neutral position.

34. An excavator type apparatus comprising a portable base mounted to rotate back and forth about a vertical axis, a boom connected pivotally to the base to swing up and down and provided at its outer end with hoisting means, a dipper stick mounted on the boom so as to move forwards and back and having at its operating end a shovel type bucket operatively connected to the hoisting means, power operated mechanism for rotating the base back and forth in order to swing the bucket laterally, power operated mechanism to move the dipper stick forwards and back in order to crowd and retract the bucket, power operated mechanism for actuating the hoisting means in order to raise and lower the bucket, power operated mechanism for swinging the boom up and down, a control member mounted to move from a neutral position from side to side, forwards and back, and up and down and so operatively connected to the first, second and third mentioned power operated mechanisms that when it is moved from side to side it effects actuation of the first mentioned mechanism, when it is moved forwards and back it effects actuation of the second mentioned mechanism and when it is moved up and down it effects actuation of the third mentioned mechanism, and a handle mounted on the control member to move back and forth from a neutral position and operatively connected to the fourth mentioned mechanism so as to effect actuation thereof when it is moved relatively to the member.

35. An excavator type apparatus comprising a portable base mounted to rotate back and forth about a vertical axis, a boom connected to and projecting from the base and provided at its outer end with hoisting means, a dipper stick mounted on the boom so as to move forwards and back and having at its operating end a shovel type bucket operatively connected to the hoisting means, power operated mechanism for rotating the base back and forth in order to swing the bucket laterally, power operated mechanism to move the dipper stick forwards and back in order to crowd and retract the bucket, power operated mechanism for actuating the hoisting means in order to raise and lower the bucket, and a control member mounted to move from a neutral position from side to side, forwards and back, and up and down and so operatively connected to said mechanisms that when it is moved from side to side it effects actuation of the first mentioned mechanism, when it is moved forwards and back it effects actuation of the second mentioned mechanism and when it is moved up and down it effects actuation of the third mentioned mechanism.

36. An excavator type apparatus comprising a base, a boom connected pivotally to the base to swing up and down and provided at its outer end with hoisting means, a dipper stick mounted on the boom so as to move forwards and back and having at its operating end a shovel type bucket operatively connected to the hoisting means, power operated mechanism to move the dipper stick forwards and back in order to crowd and retract the bucket, power operated mechanism for actuating the hoisting means in order to raise and lower the bucket, power operated mechanism for swinging the boom up and down, a control member mounted to move from a neutral position forwards and back, and up and down and so operatively connected to the first and second mentioned power operated mechanisms that when it is moved forwards and back it effects actuation of the first mentioned mechanism and when it is moved up and down it effects actuation of the second mentioned mechanism, and a handle mounted on the control member to move back and forth from a neutral position and operatively connected to the third mentioned mechanism so as to effect actuation thereof when it is moved relatively to the member.

37. An excavator type apparatus comprising a portable base mounted to rotate back and forth about a vertical axis, a boom connected pivotally to the base to swing up and down, a dipper stick mounted on the boom so as to move forwards and back and having at its operating end a shovel type bucket, power operated mechanism for rotating the base back and forth in order to swing the bucket bodily in a sidewise direction, power operated mechanism to move the dipper stick forwards and back in order to crowd and retract the bucket, power operated mechanism for swinging the boom up and down, a control member mounted to move from a neutral position from side to side and forwards and back, and so operatively connected to the first and second mentioned power operated mechanisms that when it is moved from side to side it effects actuation of the first mentioned mechanism and when it is moved forwards and back it effects actuation of the second mentioned mechanism, and a handle mounted on the control member to move back and forth from a neutral position and operatively connected to the third mentioned mechanism so as to effect actuation thereof when it is moved relatively to the member.

38. An apparatus comprising a portable base mounted to rotate back and forth about a vertical axis, a boom connected pivotally to the base to swing up and down and provided at its outer end with hoisting means, a load carrying element connected to the hoisting means, power operated mechanism for rotating the base back and forth in order to swing the element from side to side, power operated mechanism for actuating the hoisting means in order to raise and lower the element, power operated mechanism for swinging the boom up and down, a control member mounted to move from a neutral position from side to side and up and down and so operatively connected to the first and second mentioned power operated mechanisms that when it is moved from side to side it effects actuation of the first mentioned mechanism and when it is moved up and down it effects actuation of the second mentioned mechanism, and a handle mounted on the control member to move back and forth from a neutral position and operatively connected to the third mentioned mechanism so as to effect actuation thereof when it is moved relatively to the member.

39. An apparatus comprising a portable base mounted to rotate back and forth about a vertical axis, a boom connected to and projecting from the base and provided at its outer end with hoisting means, a load carrying element connected to the hoisting means, power operated mechanism for rotating the base back and forth in order to swing the element laterally, power operated mechanism for actuating the hoisting means in order to raise and lower the element, and a control member mounted to move from a neutral position from side to side and up and down and so operatively connected to the power operated mechanisms that when it is moved from side to side it effects actuation of the first mentioned mechanism and when it is moved up and down it effects actuation of the second mentioned mechanism.

40. An apparatus comprising a base, a boom connected pivotally to the base to swing up and down and provided at its outer end with hoisting means, a load carrying element connected to the hoisting means, power operated mechanism for actuating the hoisting means in order to raise and lower the element, power operated mechanism for swinging the boom up and down, and a control unit embodying a first member mounted to move up and down from a neutral position and so operatively connected to the first mentioned mechanism that when it is moved up and down it effects actuation of said first mentioned mechanism, a second member supported by the first member, mounted to tilt forwards and back about a horizontal axis, and so operatively connected to the second mentioned mechanism that when it is tilted it effects actuation of said second mentioned mechanism.

41. An apparatus comprising a base, a boom connected pivotally to the base to swing up and down and provided at its outer end with hoisting means, a load carrying element connected to the hoisting means and embodying hinged parts with latch means for holding its parts together, power operated mechanism for actuating the hoisting means in order to raise and lower the element, power operated mechanism for swinging the boom up and down, and a control unit embodying a first member mounted to move up and down from a neutral position and so operatively connected to the first mentioned mechanism that when it is moved up and down it effects actuation of said first mentioned mechanism, a second member supported by the first member, mounted to tilt forwards and back about a horizontal axis, and so operatively connected to the second mentioned mechanism that when it is tilted it effects actuation of said second mentioned mechanism, and a push button mounted on the second member and connected to control actuation of the latch means.

42. An apparatus comprising a portable base mounted to rotate back and forth about a vertical axis, a boom pivotally connected to the base to swing up and down and provided at its outer end with hoisting means, a load carrying element connected to the hoisting means and having means associated with it for moving it bodily inwards in the direction of the inner end of the boom, power operated mechanism for rotating the base back and forth in order to swing the element sidewise, power operated mechanism for actuating the hoisting means in order to raise and lower the element, power operated mechanism for actuating the element moving means in order to move said element toward said inner end of the boom, power operated mechanism for swinging the boom up and down, a control member mounted to move from a neutral position from side to side, up and down, and forwards and back and so operatively connected to the first, second and third mentioned power operated mechanisms that when it is moved from side to side it effects actuation of the first mentioned mechanism, when it is moved up and down it effects actuation of the second mentioned mechanism and when it is moved back it effects actuation of the third mentioned mechanism, and a handle mounted on the control member to move back and forth from a neutral position and operatively connected to the fourth mentioned mechanism so as to effect actuation thereof when it is moved relatively to the member.

43. An apparatus comprising a base, a boom pivotally connected to the base to swing up and down and provided at its outer end with hoisting means, a load carrying element connected to the hoisting means and having means associated with it for moving it bodily inwards in the direction of the inner end of the boom, power operated mechanism for actuating the hoisting means in order to raise and lower the element, power operated mechanism for actuating the element moving means in order to move said element towards said inner end of the boom, power operated mechanism for swinging the boom up and down, a control member mounted to move from a neutral position up and down and and forwards and back and so operatively connected to the first and second mentioned power operated mechanisms that when it is moved up and down it effects actuation of the first mentioned mechanism and when it is moved back it effects actuation of the second mentioned mechanism, and a handle mounted on the control member to move back and forth from a neutral position and operatively connected to the third mentioned mechanism so as to effect actuation thereof when it is moved relatively to the member.

44. An apparatus comprising a portable base mounted to rotate back and forth about a vertical axis, a boom connected to and projecting from the base and provided at its outer end with hoisting means, a load carrying element connected to the hoisting means and having means associated with it for moving it bodily inwards in the direction of the inner end of the boom, power operated mechanism for rotating the base back and forth in order to swing the element laterally, power operated mechanism for actuating the hoisting means in order to raise and lower the element, power operated mechanism for actuating the element moving means in order to move said element towards the said inner end of the boom, and a control member mounted to move from a neutral position from side to side, up and down, and forwards and back and so operatively connected to said power operated mechanisms that when it is moved from side to side it effects actuation of the first mentioned mechanism, when it is moved up and down it effects actuation of the second mentioned mechanism and when it is moved back it effects actuation of the third mentioned mechanism.

MURRAY G. CLAY.

REFERENCES CITED

The following references are of record in the file of this patent:

UNITED STATES PATENTS

| Number | Name | Date |
| --- | --- | --- |
| 1,308,997 | Simmons | July 8, 1919 |
| 1,830,224 | Calabrese | Nov. 3, 1931 |
| 1,855,988 | Ranasey | Apr. 26, 1932 |
| 1,864,329 | Volk | June 21, 1932 |
| 1,880,138 | Hubl | Sept. 27, 1932 |
| 1,912,354 | Pescara | May 30, 1933 |
| 1,928,915 | Stout | Oct. 3, 1933 |
| 1,935,004 | Winther | Nov. 14, 1933 |
| 2,025,977 | Getty | Dec. 31, 1935 |
| 2,136,454 | Miller | Nov. 15, 1938 |
| 2,144,616 | Carlson | Jan. 24, 1939 |
| 2,156,118 | Kliesrath | Apr. 25, 1939 |
| 2,224,725 | Felt, Jr. | Dec. 10, 1940 |
| 2,322,133 | Hettelsater | June 15, 1943 |
| 2,336,715 | Casler et al. | Dec. 14, 1943 |
| 2,356,517 | Hale | Aug. 22, 1944 |
| 2,360,818 | Turnbull | Oct. 17, 1944 |
| 2,372,311 | Brown | Mar. 27, 1945 |
| 2,391,881 | Clay | Jan. 1, 1946 |
| 2,393,324 | Joy | Jan. 22, 1946 |
| 2,398,601 | Seifert | Apr. 16, 1946 |
| 2,434,689 | Ewart | Jan. 20, 1948 |